INVENTOR.
Clifford W. Andersen
BY Olson, Trexler
Wolters & Bushnell
Attys.

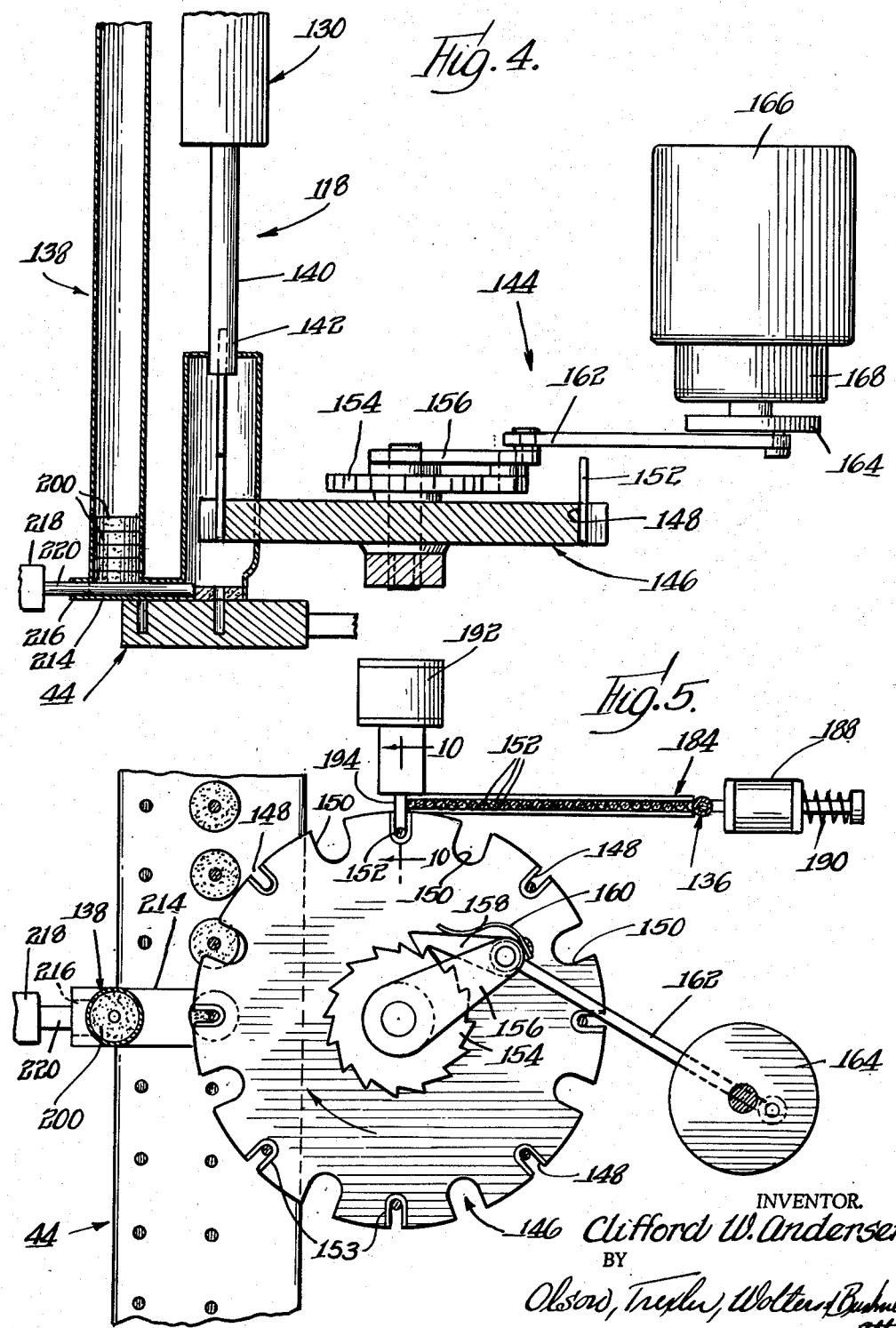

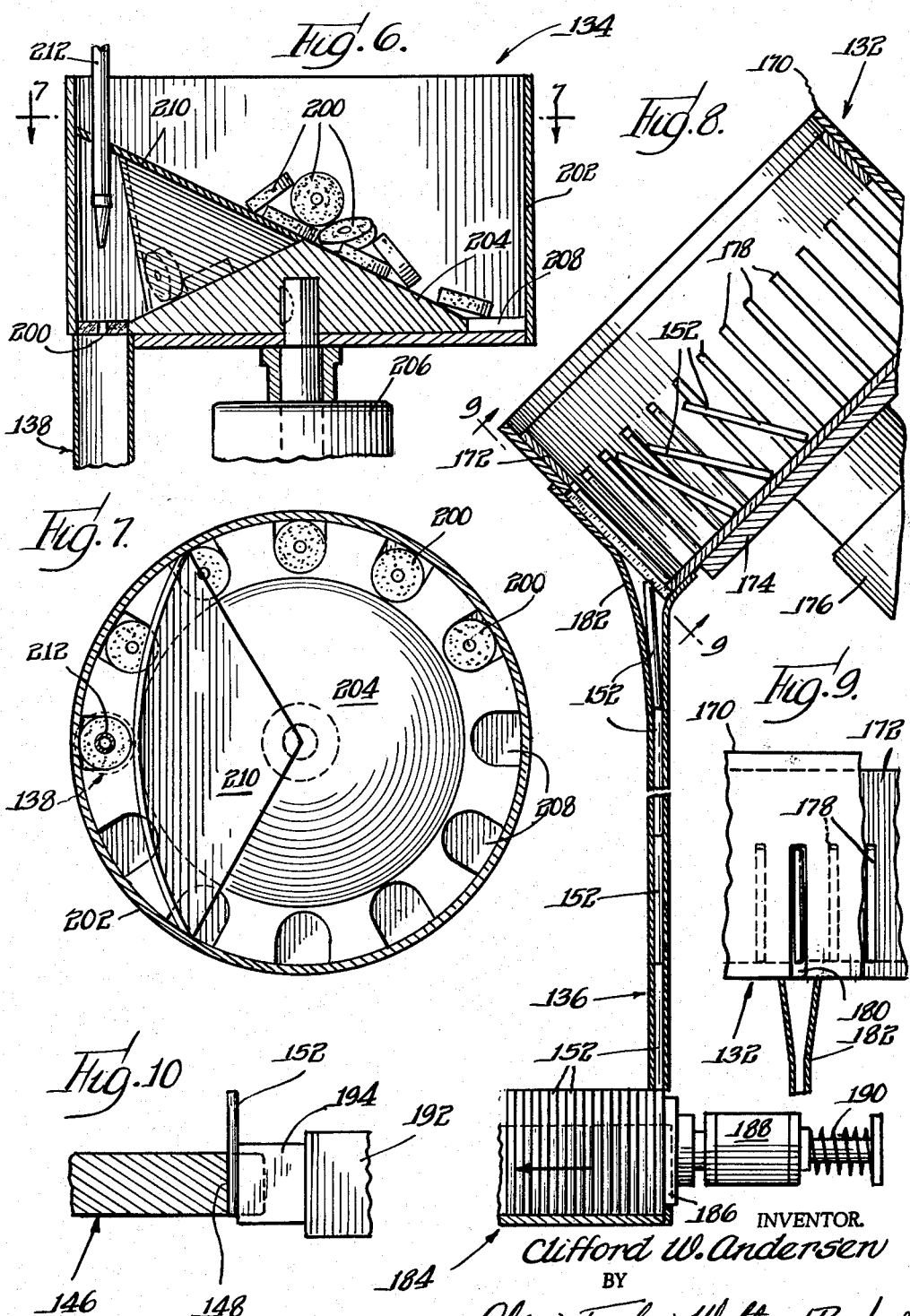

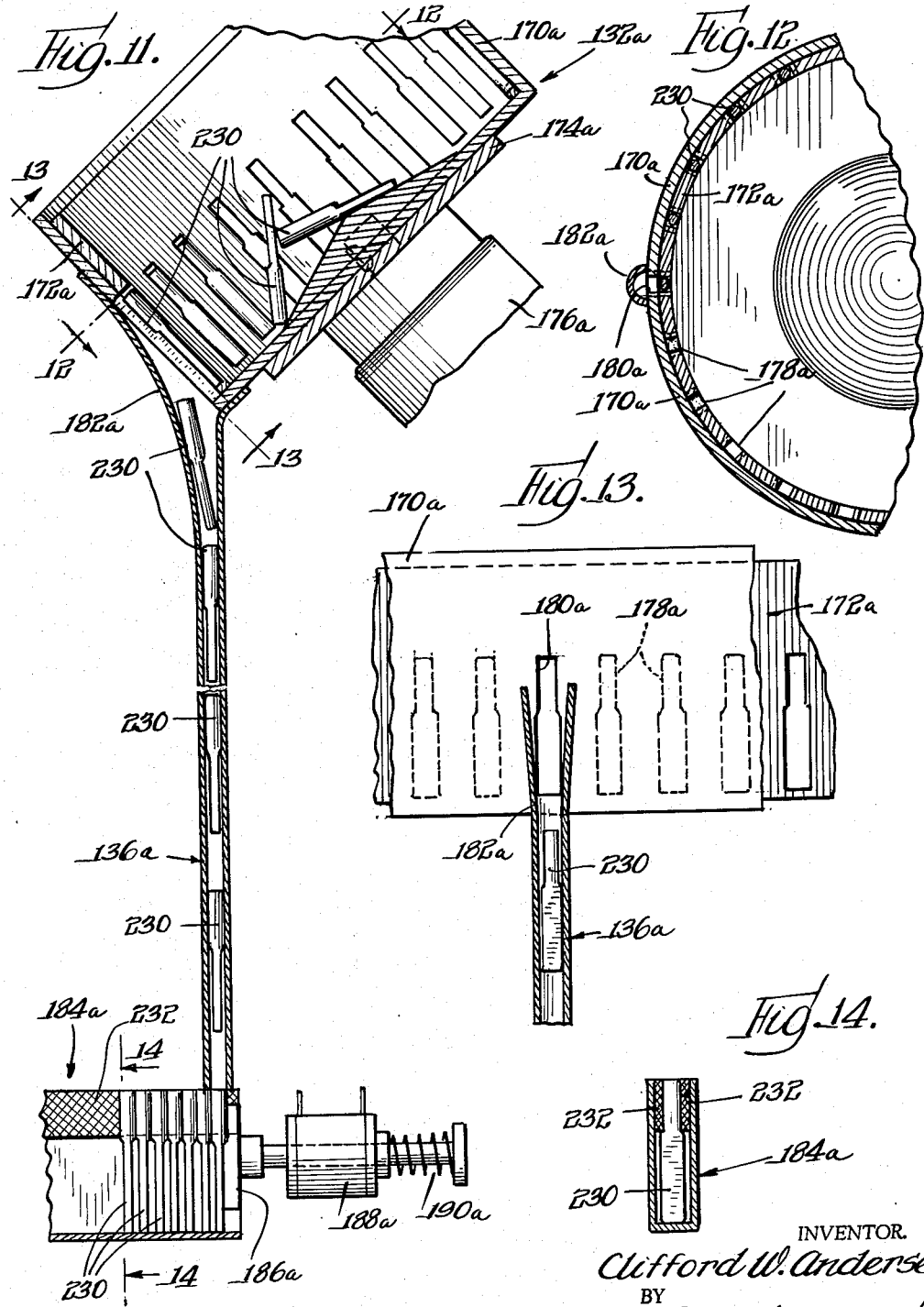

United States Patent Office 3,147,485
Patented Sept. 8, 1964

3,147,485
APPARATUS FOR PINNING A KEYFRAME
Clifford W. Andersen, De Kalb, Ill., assignor to The Wurlitzer Company, Chicago, Ill., a corporation of Ohio
Filed Mar. 20, 1962, Ser. No. 181,017
5 Claims. (Cl. 1—302)

This invention relates generally to the manufacture of keyframes for pianos and analogous musical instruments and more particularly to apparatus for setting the pins in the front and in the balance rails of such a keyframe.

In accordance with conventional practice, the key levers of a piano are fulcrumed on the rails of a keyframe by means of pins fixed to the rails in upstanding relationship. In the past, the common procedure has been to drill all of the holes in one rail of a keyframe in a single operation and thereafter to press all of the pins in these holes, also in a single operation. These steps are then repeated for the other of the rails which is to carry pins for directing the movement of the key levers. Considerable stress is imposed on rails treated in this manner, particularly during the setting of the pins; and in view of the fact that the rails are customarily made of wood, it is not surprising that support of the rail during the drilling and pinning operations has proved to be critical. Even when care has been taken to support the rail uniformly, cracking or complete splitting of a rail occurs frequently; but there is the economic loss of not only the rail itself but also the operations previously performed upon it. Furthermore, the machines for performing the gang drilling and pinning operations are costly both to acquire and to maintain.

Therefore, an important object of the present invention is to provide apparatus for separately and individually drilling holes and pressing pins into the corresponding rails of a pair of keyframes.

A more general object of the invention is to provide new and improved methods and apparatus for setting pins in a keyframe.

Another object of the invention is to provide apparatus of the type described which is economical to produce, operate and maintain.

Still another object of the invention is to provide apparatus for setting pins in a keyframe with minimal stress on the keyframe.

These and other objects and features of the invention will become more apparent upon a reading of the following descriptions.

Apparatus in accord with the invention includes table means for receiving two keyframes in parallel, spaced-apart relationship; means for stepwise reciprocating the table means in a direction laterally of the keyframes and between two positions related respectively with the row of pins for the natural note key levers and with the row of pins for the sharp note key levers; operating means for performing a drilling operation on one keyframe and for simultaneously performing a pin-pressing operation on the other keyframe; and means for stepwise transporting the operating means in a path parallel with the rails of the keyframes, the increments of travel of the operating means corresponding to the center line spacings of immediately adjacent key levers.

The invention, both to its structure and mode of operation, will be better understood by reference to the following disclosure and drawings forming a part thereof, wherein:

FIG. 4 is an enlarged, cross-sectional view taken in side elevation of the pin-pressing mechanism of the invention;

FIG. 5 is a plan view of the arrangement of FIG. 4;

FIG. 6 is an enlarged, cross-sectional view taken in side elevation of the mechanism for orienting the washers to be delivered to the arrangement of FIG. 5;

FIG. 7 is a view taken along the line 7—7 of FIG. 6;

FIG. 8 is an enlarged, cross-sectional view taken in side elevation of the mechanism for orienting balance rail pins for delivery to the pin-pressing mechanism of FIG. 4;

FIG. 9 is a view taken along the line 9—9 of FIG. 8;

FIG. 10 is an enlarged view taken along the line 10—10 of FIG. 5;

FIG. 11 is a view similar to the showing of FIG. 8 but illustrating the mechanism for orienting front rail pins and for delivering the same to a pin-pressing mechanism;

FIG. 12 is a view taken along the line 12—12 of FIG. 11;

FIG. 13 is a view taken along the line 13—13 of FIG. 11; and

FIG. 14 is a view taken along the line 14—14 of FIG. 11.

Figure 1:
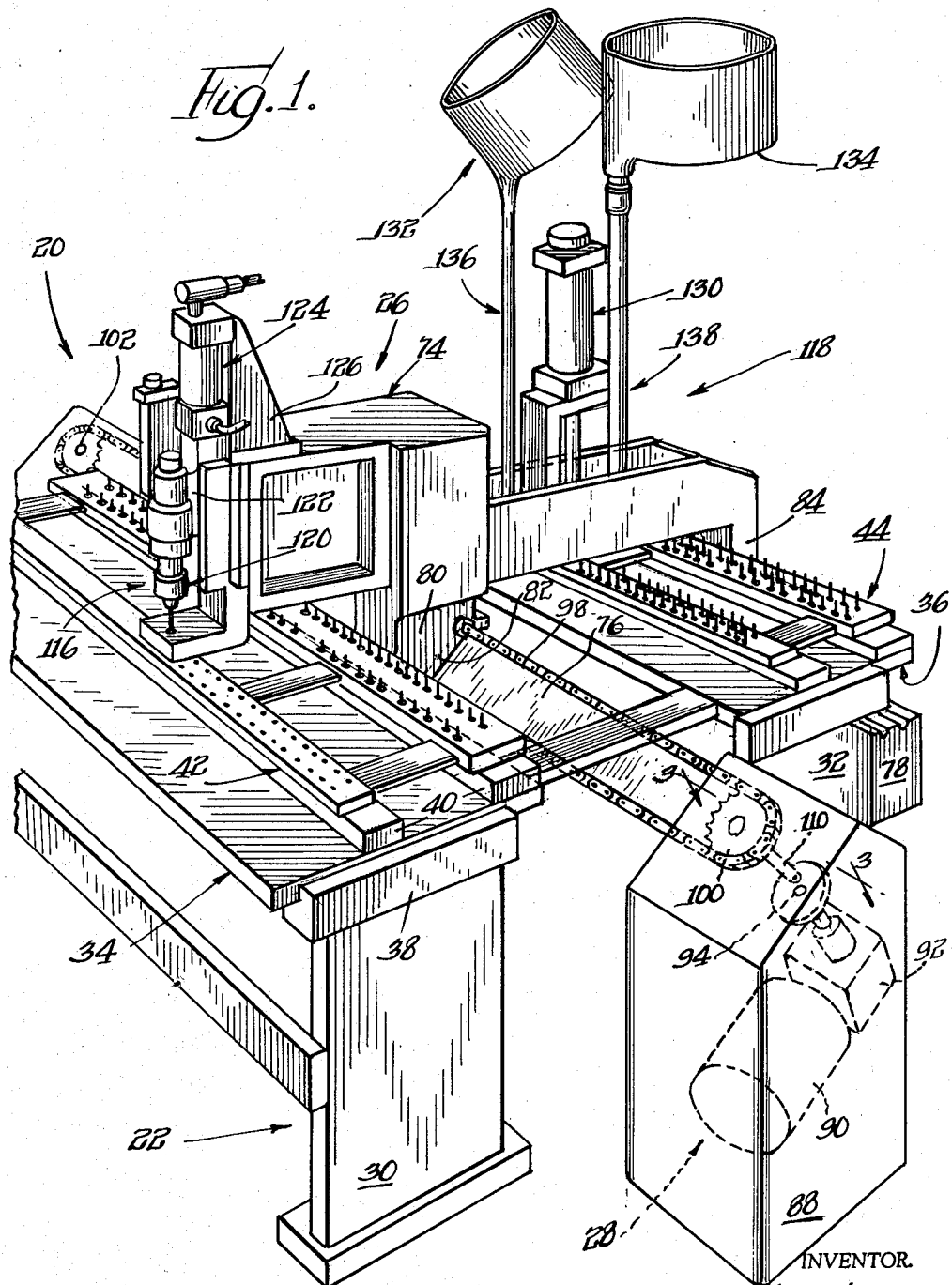
FIG. 1 is a perspective view of apparatus for separately drilling and pressing pins into the corresponding rails of a pair of keyframes, the apparatus being constructed in accordance with the principles of the present invention.
Figure 2:
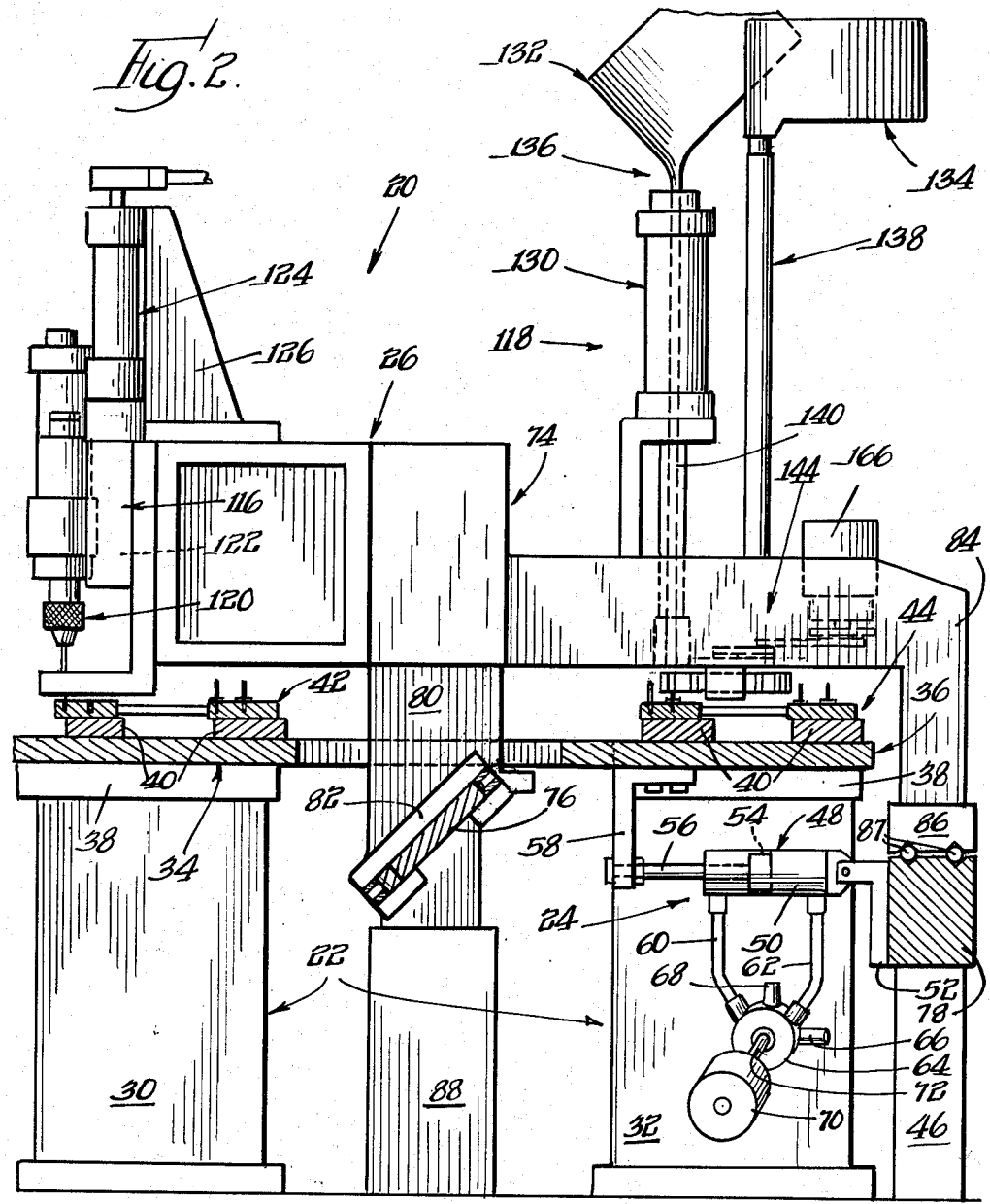
FIG. 2 is an end elevational view of the apparatus of FIG. 1.

Referring now in detail to the drawings, specifically to FIGS. 1 and 2, apparatus for separately drilling holes and pressing pins into the corresponding rails of a pair of keyframes is indicated generally by the numeral 20. The apparatus 20 includes a table arrangement 22 for receiving the keyframes, a drive arrangement 24 (best shown in FIG. 2) for stepwise reciprocating the platforms of the table arrangement 22, an operating arrangement 26 for performing a drilling operation on one keyframe and for simultaneously performing a pin-pressing operation on the other keyframe, and a drive arrangement 28 for stepwise transporting the operating arrangement 26.

The table arrangement 22 includes a pair of benches 30 and 32 on which a pair of platforms 34 and 36 are slidably supported in guides 38. The platforms 34 and 36 are interconnected at the confronting lateral sides in order to be movable in unison; and wooden blocks 40 are appropriately positioned on the platforms 34 and 36 to extend the lengths thereof for use in mounting a keyframe 42 and a keyframe 44 respectively to the platforms 34 and 36. The blocks 40 specifically underlie the front rail and the balance rail of the respective keyframes. Moreover, the keyframes 42 and 44 are disposed on the platforms 34 and 36 in parallel, spaced-apart relationship as is indicated in FIGS. 1 and 2.

In accordance with the invention, means are provided for stepwise reciprocating the interconnected platforms 34 and 36 in a direction laterally of the keyframes mounted thereon; and with reference to FIG. 2, the drive arrangement 24 will be seen operatively connected between platform 36 and a standard 46. The drive arrangement 24 includes a pneumatic motor 48 of the piston-type; and the motor 48 comprises a cylinder 50 which is mounted to the standard 46 by a bracket 52. The motor 48 also comprises a piston 54 which is affixed to a shaft 56, and the shaft 56 is connected to platform 36 by means of a bracket 58.

Compressed air is alternately delivered to and exhausted from opposite sides of piston 54 through lines 60 and 62, which lines are connected to a rotary valve 64. Valve 64 is connected to a source of compressed air by a conduit 66 and is provided with an exhaust outlet 68. In addition, valve 64 is coupled to an electric motor 70 by a crank 72, rotation of the valve causing reciprocation of the piston 54 within the cylinder 50 and thereby stepwise reciprocation of the interconnecting platforms 34 and 36. The stroke of piston 54 is arranged to coincide with the spacing between the row of pins for the natural note key levers and the row of pins for the sharp note key levers, which rows of pins are to be affixed to corresponding rails of the keyframes 42 and 44.

While the platforms 34 and 46 are adapted to be stepwise reciprocated, the operating arrangement 26 is intended to be stepwise transported in a path transverse to the direction in which the platforms are to be reciprocated. Accordingly, the operating arrangement 26 is fashioned to include a gantry crane 74 which is supported for movement on a rail 76 and a rail 78. More particularly and with reference to FIG. 2, the gantry crane 74 includes a centrally depending formation 80 which terminates in an inclined foot 82, foot 82 slidably cooperating with a correspondingly inclined surface of rail 76. Furthermore, the gantry crane 74 includes a depending end formation 84 which terminates in a truck 86; and truck 86 rests on roller balls 87 which cooperate with grooves or channels formed in rail 78. Rail 78 is advantageously supported on the standard 46 whereas rail 76 is desirably supported on a separate standard 88.

Figure 3:
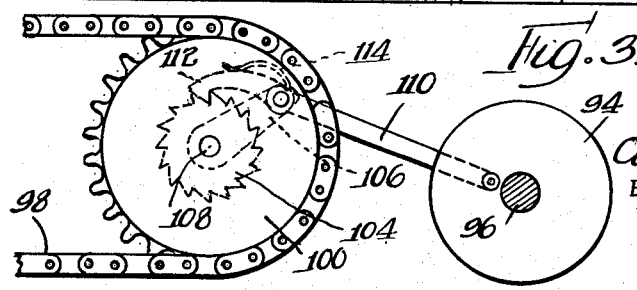
FIG. 3 is an enlarged view taken along the section 3—3 of FIG. 1.

The drive arrangement for stepwise transporting the operating arrangement 26 is indicated in FIG. 1 by the numeral 28 and will be seen to comprise an electric motor 90 whose output shaft is connected to a speed reducing gear box 92. With continued reference to FIG. 1 and with supplementary reference to FIG. 3, a disc 94 will be seen connected to the output shaft 96 from gear box 92. In order to incur the desired incremental movements of the operating arrangement 26, a drive chain 98 is stretched between a pair of sprockets 100 and 102; and the foot 82 of formation 80 is connected to chain 98. A ratchet 104 is fastened to the side of sprocket 100, and a link 106 is freely rotatably mounted on a shaft 108 by which the sprocket 100 is supported. To complete the mechanical connection between drive disc 94 and chain 98, a crank 110 is pivoted to link 106 and is pivoted at an eccentric location on disc 94. Furthermore, a pawl 112 is pivoted to the crank 110 and to the link 106 to cooperate with the ratchet 104. Advantageously, a leaf spring 114 acts between the link 106 and the pawl 112 to bias the pawl into engagement with the ratchet 104. The positioning of crank 110 relative to the center of drive disc 94 and the size and arrangement of ratchet 104 are selected so that the increments of travel of the operating arrangement 26 correspond to the center line spacing of immediately adjacent key levers, i.e., correspond to the longitudinal spacing between the immediately adjacent pins on a given rail of a keyframe.

In accordance with an important feature of the invention, the operating arrangement 26 is adapted to perform a drilling operation on one of the keyframes and simultaneously to perform a pin-pressing operation on the other keyframe. Therefore, an air drill arrangement 116 is mounted on the gantry crane 74 overlying the keyframe 42, and a press head 118 is mounted on the gantry crane 74 overlying the keyframe 44. The air drill arrangement 116 includes a pneumatically operated drill 120 which is fastened to a vertically slidable bracket 122. A pneumatic motor 124 of the piston type is coupled to a bracket 126 overlying the bracket 122, and the piston shaft of the motor 124 is connected to the bracket 122 in order to cause a reciprocation of drill 120 whereby to bore appropriate holes in the underlying rail of keyframe 42.

The press head 118 includes a pneumatic motor 130 of the piston type, a pin hopper 132, a washer hopper 134 and conveyors 136 and 138 for delivering pins and washers respectively from the hoppers to the vicinity of the keyframe being worked upon by the press head 118.

Turning to FIGS. 4-10 for a more detailed description of press head 118, the pneumatic motor 130 will be seen to include a piston shaft 140 having an axially recessed end 142, the recess in end 142 being arranged to receive and frictionally grip a pin which it is desired to press into a rail of keyframe 44. Pins are delivered to the recessed end 142 by means of a mechanism 144 which is shown in FIGS. 4 and 5 to include a rotatably mounted starwheel 146 whose periphery is provided with alternate series of radial apertures 148 and 150. The apertures 148 are adapted frictionally to receive and grip a balance rail pin 152 as by being lined with leather or felt 153; and the apertures 150 are arranged freely to pass shaft 140 of the press head 118. The motor 130 is arranged to reciprocate shaft 140 so as to pick up a pin 152 from an aperture 148 and thereafter to urge the pin into an underlying bore in the keyframe, passing through an aperture 150 in the process.

In order to provide the necessary stepping of starwheel 146, a ratchet 154 is fixed to the starwheel; and a freely rotatable link 156 is pivoted to ratchet 154 to carry a pawl 158 which is biased into engagement with the teeth of ratchet 154 by means of a leaf spring 160. A crank 162 is pivoted to link 156 and to an eccentric position on a drive disc 164, disc 164 being connected to the output shaft of an electric motor 166 through a speed-reducing gear box 168.

The pins 152 are shown to be the cylindrical pins customarily used on the balance rail of a keyframe; and these pins 152 are, in the instant invention, oriented and fed to the starwheel 146 and inserted individually in the apertures 148. With reference to FIGS. 8 and 9, the pin hopper 132 will be seen to comprise a fixed and inclined outer drum 170 and an inner drum 172 which is mounted to a plate 174, plate 174 being rotated by an electric motor 176. The sides of rotating drum 172 are fashioned with axially extending slots 178, the length and width of which correspond to the length and width of the pins 152. Furthermore, the fixed outer drum 170 has a similarly sized slot 180 which is situated at the lower end of the drum and which opens into a trough 182 leading into the conveyor 136. Thus, as the inner drum 172 is rotated by motor 176, the pins 152 are tumbled about within the inner drum; and some of the pins find their way into the slots 178. Thereafter, as these slots pass into alignment with the slot 180, the pins contained in slots 178 drop through the trough 182 and into the conveyor 136. The conveyor 136 feeds a second conveyor 184; and the pins 152 are moved along the conveyor 184 by a reciprocating plunger 186, plunger 186 being actuated by a solenoid 188, the armature of which is biased by a compression spring 190.

The pins 152 are delivered from the conveyor 136 to the conveyor 184 by solenoid 188 retracting plunger 186 to permit a pin to fall in place at the end of the line of pins. Subsequent extension of the plunger 186 by the action of solenoid 188 urges the aligned pins along the conveyor 184; and with reference to FIGS. 5 and 10, a solenoid 192 will be seen disposed at the end of conveyor 184 and provided with a plunger 194. The action of plunger 194 which is urged by solenoid 192 delivers the pins 152 from the conveyor 184 into the recesses 148 of starwheel 146.

It is desirable to assemble a washer with the pin being driven into the keyframe; and accordingly, a quantity of appropriate washers 200 are supplied to the hopper 134 as is shown in FIG. 6. In order to orient the washers 200 with respect to the tubular conveyor 138, the hopper 134 includes a fixed drum 202 and a conical turret 204 which is coupled to the output shaft of an electric motor 206 in order that it may be rotated. As is particularly well shown in FIG. 7, the turret 204 is peripherally provided with a number of radial slots 208 which are of a size to receive a washer 200 when the same is aligned with the floor of the turret. A baffle 210 is fastened to the fixed drum 202 in order to scrape malpositioned washers from the slots 208 as the turret rotates the slots beneath the edge of the baffle. A nozzle 212 directs air into the conveyor 138 to dispatch those washers which have been properly positioned in the slots 208 as they are aligned with conveyor 138.

Returning to FIG. 4, the end of conveyor 138 opens into a housing 214 which overlies a rail of the keyframe 44 and which includes a passageway 216. A pneumatic motor 218 is juxtaposed with housing 214, and the piston shaft 220 of motor 218 extends into the passageway 216 to lever the washers 200 individually into position beneath the shaft 140 of press head 118.

Thus, the motor 218 is employed to deliver washers into alignment with the pin being pressed into the rail of the keyframe; and the washer is, in effect, fitted over the pin as the pin is being presesd into the pre-drilled bore.

For purposes of affording a more complete understanding of the invention, it is advantageous now to provide a functional description of the mode in which the component parts thus far identified cooperate. Assuming therefore that the keyframes 42 and 44 have been properly positioned on the platforms 34 and 36 respectively as is shown in FIG. 1, and further assuming that it is the balance rails which are to be worked upon and additionally assuming that the balance rail of keyframe 42 has not yet been drilled while the balance rail of keyframe 44 has been drilled with the appropriate pin-receiving bores, apparatus 20 will be partially ready for use. Before actual operation of the apparatus can begin, it is necessary to position the gantry crane 74 so that the air drill arrangement 116 and the press head 118 are disposed at one end of the keyframes 42 and 44. This is accomplished by suitably energizing chain 98 employing motor 90.

With the initial position achieved, drill 120 is caused to rotate and motor 124 is caused to urge the drill 120 downward and into aggressive engagement with the balance rail of keyframe 42. Simultaneously, the shaft 140 of press head 118 is lowered by the action of pneumatic motor 130 to accept a pin 152 from the starwheel 146; and thereafter, motor 130 is directed to retract shaft 140 so as to permit starwheel 146 to be indexed aligning an aperture 150 beneath the recessed head 142. With this alignment achieved, motor 130 is again energized to lower the shaft 140; and the pin 152 being carried thereby is passed through a washer 200 aligned therebeneath and into the previously drilled bore in the balance rail of keyframe 44 in accordance with the showing of FIG. 4. Next, the shaft 140 is retracted by motor 130 and the drill 120 is retracted by motor 124.

With the functional operations thus completed, it is necessary to reposition the gantry crane 174 and the platforms 134 and 136. Hence, drive arrangement 24 is energized to translate the platforms 34 and 36 laterally if the next hole to be drilled and the next pin to be pressed are not in the row previously worked upon. If the next operation is to be performed in the same row, no lateral oscillation of the platforms is incurred. In either event, the subsequent step involves indexing the gantry crane 74 along the rails 76 and 78; and this is accomplished by actuation of sprocket 100 by means of motor 90 and the drive arrangement including ratchet 104 and pawl 112.

While the indexing of the gantry is taking place, solenoids 188 and 192 are energized to deliver a pin to the next aperture 148 presented to the plunger 194; and the starwheel 146 is rotated in the described stepped fashioned to realign a pin 152 beneath the recessed head 142 of shaft 140.

When the indexing of the gantry crane is achieved, motor 218 is energized to deliver a washer 200 from the housing 214 to a position aligned beneath the shaft 140 and a cycle of operation will have been completed. Operation will thus continue with the stepping of the gantry crane cooperating with the reciprocation of the platforms 34 and 36 in the step-by-step drilling of holes and pressing of pins into the keyframes 42 and 44.

It is to be noted in FIG. 1 that the apparatus 20 is simultaneously drilling holes in the balance rail of keyframe 42 and pressing pins into the balance rail of keyframe 44, the corresponding front rails of the two keyframes having previously drilled and pinned. Essentially the same apparatus is used in drilling and pinning the front rails; but since a flattened pin and a large soft washer are customarily used on the front rail instead of the cylindrical pin and hard washer used in the balance rail, a slight modification of the mechanism for orienting the pins is required when operation on the front rails is contemplated.

Therefore and turning to FIGS. 11–14, a modified form of the pin hopper is shown. Since the pin hopper of FIGS. 11–14 is similar in many respects to pin hopper of FIGS. 8 and 9, like numerals have been used to designate like parts in the two embodiments, and the suffix letter "a" has been used to distinguish those parts associated with the embodiment of FIGS. 11–14.

In FIGS. 11–14 the customary shaped front rail pins are indicated by the numeral 230; and it is to be noted that the slots 178a in the rotatable drum 172a and the slot 180a in the fixed drum 170a are correspondingly shaped to receive the pins 230. Moreover, the conveyor 184a is arranged to grip the cylindrical end portion of the pins 230 and is, therefore, provided with opposed felt strips 232, well shown in FIG. 14. The felt strips 232 grip the cylindrical portion of the pins 230 in order to maintain the spatial orientation of the pins which has been achieved by means of the slots 178a, and 180a in the hopper arrangement 132a. Similarly, large soft washers fabricated of felt are substituted in the washer hopper arrangement for the hard washers when work is to be performed on the front rails of a pair of keyframes.

The specific examples herein shown and described are illustrative only. Various changes may occur to those skilled in the art; and these changes are to be understood as forming a part of this invention insofar as they fall within the spirit and scope of the appended claims.

I claim:

1. Apparatus for separately drilling holes and pressing pins into the corresponding rails of a pair of keyframes, said apparatus comprising: table means for receiving two keyframes in parallel, spaced-apart relationship; means for stepwise reciprocating said table means in a direction laterally of said keyframes and between two positions related respectively with the row of pins for the natural note levers and with the row of pins for the sharp note key levers; operating means for performing a drilling operation on one keyframe and for simultaneously performing a pin-pressing operation on the other keyframe, including a drill arrangement, a pin-pressing arrangement and structural means supporting said arrangements in spaced-apart relationship; and means for stepwise transporting said operating means in a path parallel with the rails of said keyframes, the increments of travel of said operating means corresponding to the center line spacings of immediately adjacent key levers.

2. Apparatus according to claim 1 wherein said pin-pressing arrangement includes a piston, means for orienting and delivering an annular washer element into aligned relationship with said piston, means for orienting and delivering a pin element into aligned relationship between said piston and said washer element, and means for reciprocating said piston to press said pin element through the hole in said washer element and into a previously drilled hole in a said rail.

3. Apparatus according to claim 1 wherein said pin-pressing arrangement includes a piston having a recessed end adapted to receive a pin element, means for orienting and delivering an annular washer element into aligned relationship with the end of said piston, means for orienting and delivering a pin element into axially aligned relationship between said piston and said washer element, and means for reciprocating said piston to press said pin element through the hole in said washer element and into a previously drilled hole in a said rail.

4. Apparatus for separately drilling holes and pressing pins into the corresponding rails of a pair of keyframes, said apparatus comprising: table means for receiving two keyframes in parallel, spaced-apart relationship; means for reciprocating said table means in a direction laterally of said keyframes and between two positions related respectively with the row of pins for the natural note key levers and with the row of pins for the sharp note key levers; operating means for performing a drilling operation on one keyframe and for simultaneously performing a pin-pressing operation on the other keyframe, including a drill arrangement, a pin-pressing arrangement and structural means supporting said arrangements in spaced-apart relationship; track means slidably supporting said structural means at two locations; means for stepwise transporting said operating means in a path parallel with the rails of said keyframes, the increments of travel of said operating means corresponding to the center line spacings of the immediately adjacent key levers, said stepwise transporting means including drive means operative between said track means and said structural means for moving said structural means through said increments of travel.

5. Apparatus for separately drilling holes and pressing pins into the corresponding rails of a pair of keyframes, said apparatus comprising: table means for receiving two keyframes in parallel, spaced-apart relationship; operating means for performing a drilling operation on one keyframe and for simultaneously performing a pin-pressing operation on the other keyframe, including a drill arrangement, a pin-pressing arrangement and structural means for supporting said arrangements in spaced-apart relationship, said pin-pressing arrangement including a piston, means for orienting and delivering an annular washer element into aligned relationship with said piston, means for orienting and delivering a pin element into aligned relationship between said piston and said washer element, and means for reciprocating said piston to press said pin element through the hole in said washer element and into a previously drilled hole in a said rail; and means for incurring relative lateral and relative longitudinal movement between said table means and said operating means.

References Cited in the file of this patent

UNITED STATES PATENTS

| | | |
|---|---|---|
| 665,092 | Henius et al. | Jan. 1, 1901 |
| 2,623,209 | Unwin | Dec. 30, 1952 |
| 3,012,258 | Schott et al. | Dec. 12, 1961 |